– –
United States Patent [19]

Sasaki et al.

[11] Patent Number: 4,631,578

[45] Date of Patent: Dec. 23, 1986

[54] METHOD OF AND APPARATUS FOR FORMING A COLOR PICTURE USING A PLURALITY OF COLOR CORRECTION PROCESSINGS

[75] Inventors: Takashi Sasaki; Hideaki Kawamura, both of Tokyo; Nobuaki Sakurada, Yokohama, all of Japan

[73] Assignee: Canon Kabushiki Kaisha, Tokyo, Japan

[21] Appl. No.: 583,735

[22] Filed: Feb. 27, 1984

[30] Foreign Application Priority Data

Mar. 4, 1983 [JP] Japan .................................. 58-35359
Mar. 7, 1983 [JP] Japan .................................. 58-37045

[51] Int. Cl.$^4$ .......................... G03F 3/08; H04N 1/46
[52] U.S. Cl. ......................................... 358/80; 358/75
[58] Field of Search ................. 358/80, 75, 78, 75 IJ; 346/140 R, 140 IJ, 140 PD; 364/526

[56] References Cited

U.S. PATENT DOCUMENTS 4,314,274 2/1982 Atoji et al. ............................ 358/80
4,414,635 11/1983 Gast et al. ............................ 358/75
4,488,245 12/1984 Dalke et al. .......................... 358/80
4,533,928 8/1985 Sugiura et al. ....................... 358/80
4,560,997 12/1985 Sato et al. ...................... 346/140 PD

FOREIGN PATENT DOCUMENTS 156264 9/1982 Japan ............................ 346/140 PD Primary Examiner—James J. Groody
Assistant Examiner—Randall S. Svihla
Attorney, Agent, or Firm—Fitzpatrick, Cella, Harper & Scinto

[57] ABSTRACT

In a method and apparatus for forming a high quality color picture, a color space is divided into several areas and the color correction processing is performed using a different color-correction function for every area. The disclosed method and apparatus are particularly adapted to eliminate false lines ("pseudo boundaries") in pictures formed using colorants having different concentrations or densities. The false lines or "pseudo boundaries" occur at points where a colorant of one concentration is replaced by a colorant of a different concentration, and are eliminated by switching between two color correction processing means corresponding to the two colorants of different concentrations in a mutually exclusive random or alternating manner.

17 Claims, 9 Drawing Figures

METHOD OF AND APPARATUS FOR FORMING A COLOR PICTURE USING A PLURALITY OF COLOR CORRECTION PROCESSINGS

BACKGROUND OF THE INVENTION

1. Field of the Invention

The present invention relates to method of and apparatus for forming a full natural color picture in accordance with an input picture image data.

Although the present invention can be applied to various printers such as an ink-jet printer, thermal transfer copying printer, electrophotographic printer, etc., the invention will be described hereinbelow with respect to an example of a color ink-jet printer.

2. Description of the Prior Art

The apparatus of this kind reproduces a color picture by controlling a quantity of each ink to be formed in a microarea (picture element—pixel) in accordance with an input picture image data using at least three kinds of inks of cyan (c), magenta (m) and yellow (y), or using four kinds of inks additionally including black (b).

However, for example with respect to a magenta ink, it absorbs certain degrees of the blue and red lights, although it should inherently absorb only the green light component. This is similar to the cases regarding the other inks. In addition, since the inks together blot, unless the color correction or compensation of density data is not performed, the picture having the hue and density which are different from the hue and density to be reproduced would have been formed.

To prevent this drawback, conventionally, the following color correction called masking has been performed in general.

$$c' = fc(y, m, c)$$
$$m' = fm(y, m, c)$$
$$y' = fy(y, m, c)$$

where, y, m and c are input picture data; y', m' and c' are color-corrected density data; and fc, fm and fy are color-correction functions.

Various functions have been proposed with respect to fc, fm and fy, but the following linear masking function is ordinarily used.

$$fc(y, m, c) = a_{11}y + a_{12}m + a_{13}c$$
$$fm(y, m, c) = a_{21}y + a_{22}m + a_{23}c$$
$$fy(y, m, c) = a_{31}y + a_{32}m + a_{33}c$$

On the other hand, in the case of reproducing a full color picture, it has been concluded that it is preferable to use a plurality of inks each having a different density even with regard to the same color in order to enhance the dynamic range of density and to reproduce a delicate quality color feeling at the highlight portion or halftone portion. Namely, it is possible to reproduce a picture having colors of low to high densities by using a low-density ink at the highlight portion and using a high-density ink at the shadow portion.

However, in case of forming a picture using a plurality of inks each having a different density, if the color correction is performed using a conventional method, it is difficult to perform the color correction over the whole range from the highlight portion to the shadow portion due to the difference of characteristics between the high-density ink and the low-density ink, causing deterioration in overall picture quality.

In addition, it is difficult to perform the color correction by way of the same color-correction function with regard to the whole area of color space (coordinates) since the color-correction function itself becomes complicated.

SUMMARY OF THE INVENTION

It is an object of the present invention to provide a method of and an apparatus for forming a color picture whereby a color space is divided into several areas and the color correction is performed using a different color-correction function for every area in consideration of such a conventional technology as mentioned above.

It is another object of the present invention to provide a method of and an apparatus for forming a color picture whereby the color correction is performed using different color-correction functions depending upon combinations of coloring materials (colorants) to be used.

Still another object of the present invention is to provide a method of and an apparatus for forming a color picture whereby the optimum color correction can be always performed in the case where a plurality of colorants each having a different density are used with respect to at least one color among a plurality of colors for reproducing a color picture.

An additional object of the present invention is to provide a method of and an apparatus for forming a color picture whereby when a colorant to be used is changed, it is possible to prevent a pseudo or false boundary, which may be caused by changing from one colorant to another.

A still further object of the present invention is to provide a method of and an apparatus for forming a color picture whereby when a plurality of colorants are used with respect to at least one color among a plurality of colors to be used, the optimum color correction is always performed and at the same time the occurrence of pseudo boundary can be prevented.

DETAILED DESCRIPTION OF THE PREFERRED EMBODIMENTS

Figure 1:
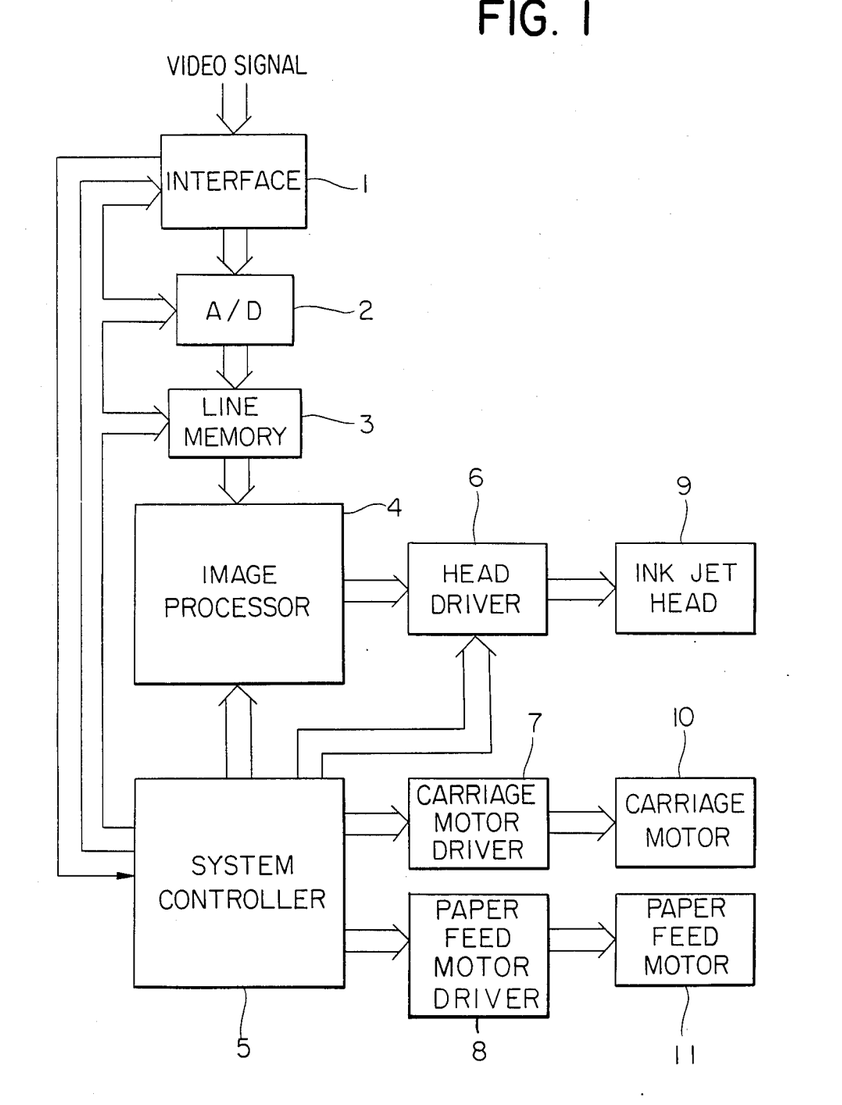
FIG. 1 shows a control block diagram of a color ink-jet printer to which the present invention can be applied.

FIG. 1 shows a block diagram of a signal processing section of an ink-jet printer to which the present invention can be applied. Its operation will be described hereinbelow.

A composite signal including a video signal of a projection image, e.g., each chrominance signal of R (red), G (green) and B (blue) and a sync signal is inputted to a video signal interface 1. The above respective signals are synchronized in this interface 1 and the γ conversion and color correction are performed with respect to them if necessary, and at the same time they are sampled and held by an internal sample and hold circuit (not shown). This signal is introduced to an AD converter 2 at the next stage, so that the gradient signals of the image signals R, G and B are converted into the digital signals. These digital signals are memorized in a next line memory 3 with regard to a proper number of lines. Although the lines are generally set in the vertical direction, it is obvious that they may be set in the horizontal direction. Then, the data in this line memory is converted into cyan, magenta, yellow, and black signals in general by an image processor 4 and these signals are further converted into an applied voltage value for each head and are inputted to a head driver 6. An ink jet head 9 exhausts inks of the quantities each corresponding to its driving voltage, thereby controlling density and hue. On the other hand, a system controller 5 for controlling the sequence of the printer allows a head drive signal, carriage motor drive signal and paper feed signal to be generated at the timings responsive to the input image signals. These signals are respectively supplied to the head driver 6, a carriage motor driver 7 and a paper feed motor driver 8, thereby controlling the ink jet head 9, a carriage motor and its mechanism 10, and a paper feed motor and its mechanism 11 at predetermined timings; thus, a reproduction picture of the input video signal is photo-printed on a recording medium. Since the above operation has been already well-known, the detailed description of each circuit is omitted.

Figure 2:
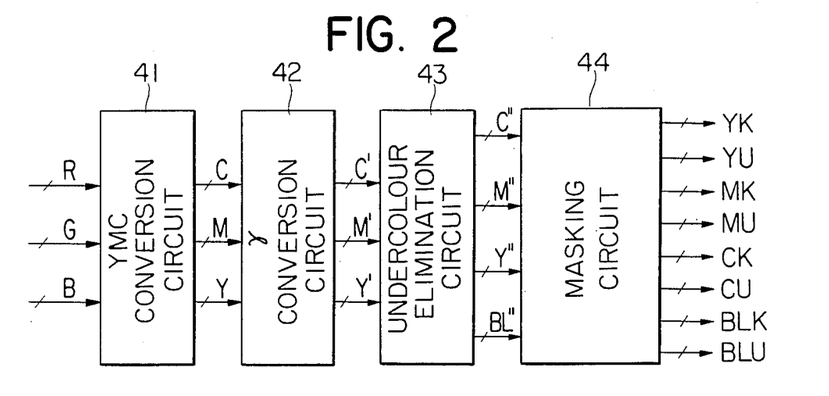
FIG. 2 shows a block diagram of an image processor of FIG. 1.

FIG. 2 is a block diagram showing the inside of the image processor 4 of FIG. 1. In the drawing, a reference numeral 41 denotes a YMC conversion circuit; 42 is a $\gamma$ conversion circuit; 43 is an undercolor elimination circuit; and 44 is a masking circuit.

The respective digital chrominance signals of R, G and B are firstly converted into the density data of yellow (Y), magenta (M) and cyan (C) by the YMC conversion circuit 41. Then, they are $\gamma$-converted by the $\gamma$ conversion circuit 42 to obtain Y', M' and C' and the colorless component is further detected by the undercolor elimination circuit 43. The density of black (BL) is determined in accordance with this colorless component and at the same time the component of BL is subtracted from Y', M' and C', thereby obtaining Y'', M'', C'', and BL''. These Y'', M'', C'', and BL'' are color-corrected by the masking circuit 44 and are transmitted to the driver circuits of the high-density ink jet head and low-density head regarding to each color.

Figure 3:
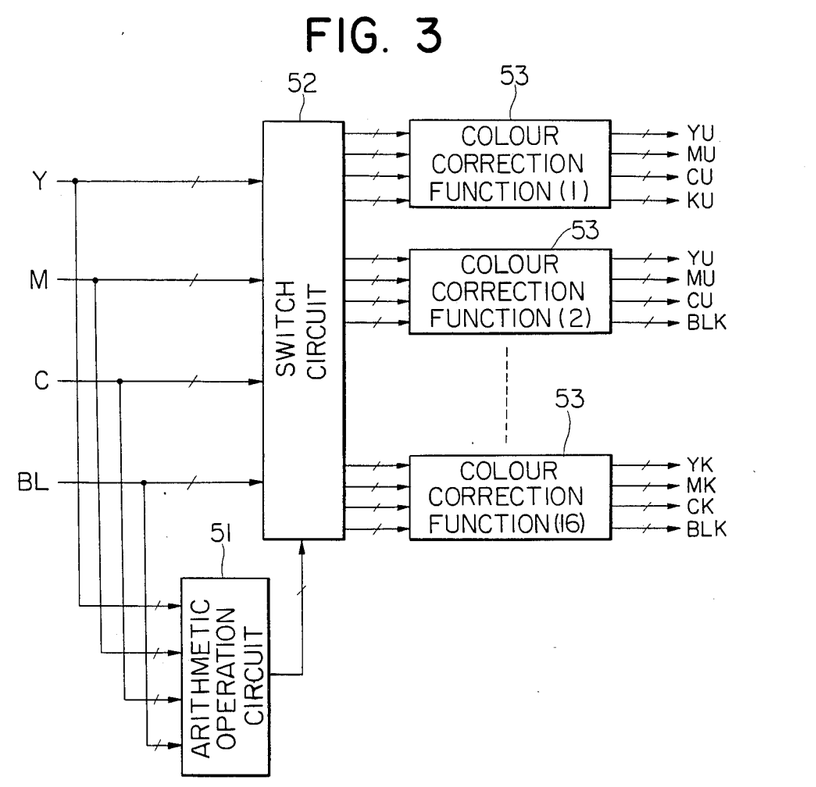
FIG. 3 shows a block diagram of a masking circuit 44 of FIG. 2.

The masking circuit 44 is shown in FIG. 3 in detail. In FIG. 3, Y, M, C, and BL denote the input digital signals to the masking circuit; YU, MU, CU, and BLU indicate the driving digital signal for the low-density ink jet heads; and YK, MK, CK, and BLK represent the driving digital signals for the high-density heads. In addition, a reference numeral 51 denotes an arithmetic operation circuit for determining which color-correction function should be used among a plurality of color-correction functions 53 on the basis of the input data, and 52 is a switch circuit for allowing the input digital signals Y, M, C, and BL to be connected to one of a plurality of color-correction function circuits 53 in response to the output of the arithmetic operation circuit 51.

The color-correction function circuits 53 of the number corresponding to the number of combinations of thin and thick inks regarding each color are prepared; in this embodiment, 16 ($=2^4$) color-correction function circuits are prepared since two kinds of thin and thick inks are used for each color.

Since each color-correction function consists of the color-correction function of each color, the color-correction functions actually consist of four expressions. Namely, assuming that the output digital signals are Y', M', C', and BL', the i-th color-correction functions are represented by $$\begin{cases} Y' = f_{Yi}(Y, M, C, BL) \\ M' = f_{Mi}(Y, M, C, BL) \\ C' = f_{Ci}(Y, M, C, BL) \\ BL' = f_{BLi}(Y, M, C, BL) \end{cases}$$

These expressions are constituted in such a manner that when a combination of the corresponding thin and thick inks is used, an color reproduction error becomes least.

For example, the first color-correction function circuit (1) is the color-correction function having the least color reproduction error in case of (Y, M, C, BL)=(thin, thin, thin, thin).

Such a color-correction function can be easily obtained by, for example, measuring the results of which Y, M, C, and BL were printed using inks having various densities and by applying a method of least squares to the relations between the measurement values and the linear combinations of Y, M, C, and BL.

If necessary, it may be possible to apply the method of least squares as the linear combinations of not only the primary terms of Y, M, C, and BL but also their secondary terms or other special function systems. In this way, the data which was color-corrected through the color-correction functions selected in accordance with the input data Y, M, C, and BL is transferred to the drivers.

The operation of the arithmetic operation circuit 51 will now be described using FIG. 4.

Figure 4:
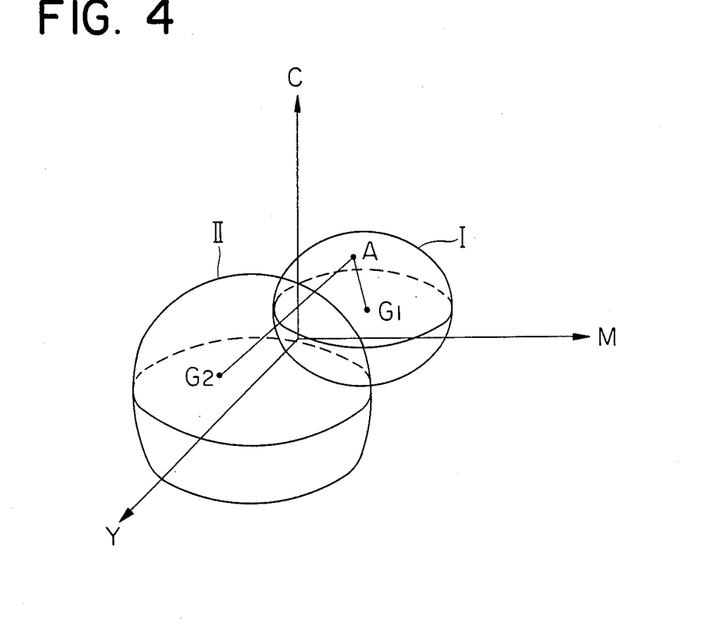
FIGS. 4 and 5 are diagrams showing areas in a color space where the color reproduction is possible.

FIG. 4 shows cross sectional views of BL=constant of the four-dimensional space using the densities of Y, M, C, and BL as the respective axes. It is assumed here that black is constant for simplicity of explanation. An area I denotes a range where the color reproduction is possible in the case where the thin inks of cyan, magenta and yellow are used. An area II represents a range where the color reproduction is possible in the case where the thick ink is used with respect to only yellow and the thin inks of cyan and magenta are used; this area II locates in the position where it slightly moved in the positive (+) direction of the Y-axis from the area I. Similar areas of only the number corresponding to the combinations of the respective thin and thick inks, i.e., 16 areas in this example exist in the four-dimensional spaces.

The boundary of each area can be determined as follows.

For example, a variable range of density relating to monochrome of the ink which constitutes an area J has been determined to be a certain range due to a bore of an orifice of the head, density of the ink, coloring property of a paper, etc.

It is assumed that these variable ranges are specified as follows:

$$\begin{cases} Y_{Lj} < Y' < Y_{Hj} \\ M_{Lj} < M' < M_{Hj} \\ C_{Lj} < C' < C_{Hj} \\ BL_{Lj} < BL' < BL_{Hj} \end{cases} \quad (1)$$

Now, assuming that the color-correction functions corresponding to the area J are $$\begin{cases} Y' = f_{Yj}(Y, M, C, BL) \\ M' = f_{Mj}(Y, M, C, BL) \\ C' = f_{Cj}(Y, M, C, BL) \\ BL' = f_{BLj}(Y, M, C, BL) \end{cases} \quad (2)$$

the following relations are needed to be satisfied.

$$\begin{cases} Y_{Lj} < f_{Yj}(Y, M, C, BL) < Y_{Hj} \\ M_{Lj} < f_{Mj}(Y, M, C, BL) < M_{Hj} \\ C_{Lj} < f_{Cj}(Y, M, C, BL) < C_{Hj} \\ BL_{Lj} < f_{BLj}(Y, M, C, BL) < BL_{Hj} \end{cases} \quad (3)$$

The conditions specified by inequalities (3) represent a certain space in the four dimensions and this is set into the area J.

In addition, $G_1$ and $G_2$ of FIG. 4 represent coordinates of the center of gravity of the areas I and II, respectively.

The coordinates $G_i$ of the center of gravity of each area J can be defined by $$G_i = \int_{\text{area } J} H \cdot g(H) \, dH$$

where, H is a four-dimensional vector and g(H) is a weight function and g(H)=1 in this embodiment.

In this embodiment, the color-correction functions are selected with reference to the distance between the coordinates (Y, M, C, BL) of the point A of the data to be plotted and the coordinates $G_i$ of the center of gravity of each area. Assuming that the distance between A and each center of gravity is $D_i = \overline{G_iA}$, i is determined to a value so as to minimize $D_i$ and by selecting a combination of the thin and thick inks responsive to the value of this i, it is possible to unconditionally determine one of the combinations of thin and thick of 1 to 16.

Figure 5:
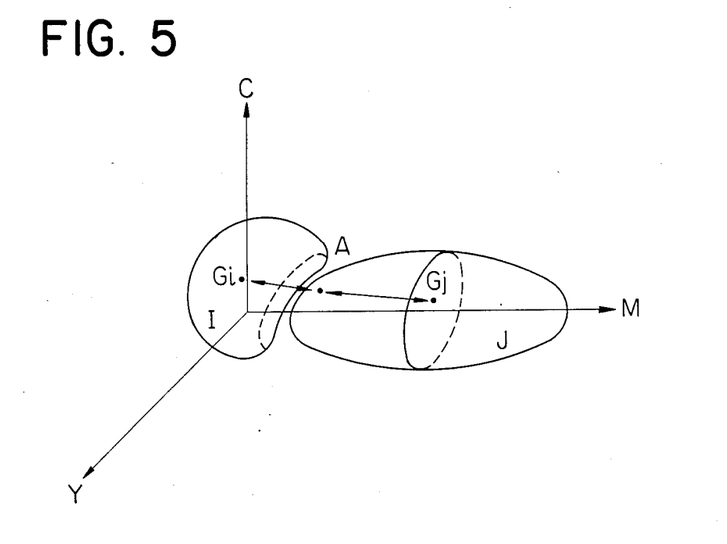

As described above, one combination of thin and thick ink can be unconditionally determined by way of a method of utilizing centers of gravity; however, even when the distance $D_i$ between the data and the center of gravity of a certain area i is smallest as shown in FIG. 5, a case can be exceptionally caused where A is out of i but exists in another area j depending upon the number of ink densities, method of combinations and kinds of papers.

In this case, the priority order is set into each area in response to the distance from the center of gravity, and the areas are checked one by one from the area having a higher priority whether its center of gravity exists in its area or not, and it may be possible to select the area which was firstly confirmed that the center of gravity exists in its area.

On the other hand, as another embodiment of the method of selecting the combination of thin and thick ink, the following method can be mentioned.

The reference values $Y_L$, $M_L$, $C_L$, and $BL_L$ of the respective Y, M, C, and BL are set for the input data (Y, M, C, BL) corresponding to each pixel. For example, if $Y < Y_L$, the thin yellow ink will be used.

In this way, for example, if $Y < Y_L$, $M < M_L$, $C < C_L$, and $BL < BL_L$, it is possible to determine such that the thin inks are used with regard to every color.

According to this method, since the logic is simple, the hardware can be easily constituted. In the case of this embodiment, for instance, since values of Y, M, C, BL are small for (Y, M, C, BL) for the pixel of a highlight portion, the distance between the area I and its center of gravity becomes minimum, so that it is determined that the area is plotted using the thin inks regarding to all C, M, Y, and BL. Thus, the data of Y, M, C, and BL are color-corrected by the color-correction function circuit (1) on the basis of the switching operation of the switch circuit 52, and Y', M', C', and BL' thus obtained are transferred to the drivers for thin inks, respectively.

Since this color-correction function circuit (1) is determined by way of a method as mentioned above, even if there are many errors of color reproduction for the thin data such as in the shadow portion, a good color reproduction will be realized for the highlight portion.

On the contrary, it is similarly determined for example that the thick inks are used with respect to all colors for the data from the shadow portion and the color-correction function circuit (16) is consequently selected, so that a good color reproduction of the shadow portion is obtained.

In addition, although the color-correction circuits are selected in accordance with a combination of the thin and thick inks in this embodiment, it is also possible to preliminarily store the conversion table of the input picture data and output picture data in a semiconductor memory and thereby to create the conversion table in consideration of the combination of the thin and thick inks. In addition, although two kinds of thin and thick inks are used with respect to each color, the present invention can be applied to every case where the inks having a plurality of densities regarding to at least one color are used.

As described above, in this embodiment, the combinations of thin and thick inks to be used are selected in accordance with the input data and by performing the different color corrections in dependence upon these combinations, the color correction can be performed so as to minimize a color reproduction error. Thus, it is possible to satisfactorily perform the color corrections with regard to the portions from the highlight portion to the shadow portion and a good color print can be obtained.

Although the above-mentioned first embodiment is extremely effective, there is a fear of occurrence of a pseudo boundary at the point where a combination of inks changes. Due to this, a second embodiment for preventing the occurrence of such a pseudo boundary will be described hereinbelow.

Figure 6:
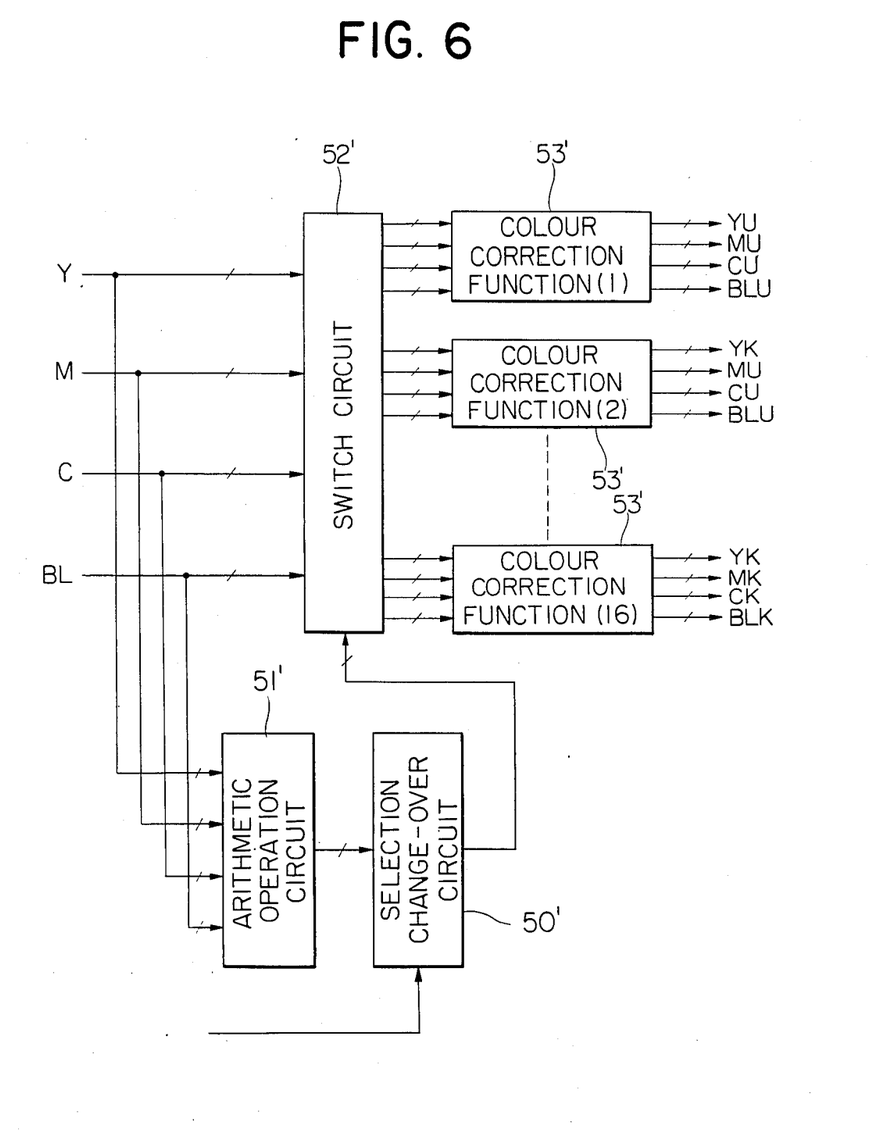
FIG. 6 shows a block diagram of the masking circuit 44 of FIG. 2.

A second embodiment of the detailed masking circuit 44 is shown in FIG. 6. In FIG. 6, Y, M, C, and BL denote input digital signals to the masking circuit; YU, MU, CU, and BLU indicate driving digital signals for the low-density ink jet heads; and YK, MK, CK, and BLK represent driving digital signals for the high-density heads.

In addition, a reference numeral 51' denotes an arithmetic operation circuit for extracting the color-correction function(s) which can be used among a plurality of color-correction functions 53' on the basis of the input data; 50' is a selection change-over circuit for sequentially switching the color-correction functions when a plurality of color-correction functions were extracted; and 52' is a switch circuit for allowing the input digital signals Y, M, C, and BL to be connected to one of a plurality of color-correction function circuits 53' in response to the output of the arithmetic operation circuit 51'.

The color-correction function circuits 53' of the number corresponding to the number of combinations of thin and thick inks of each color are prepared; in this embodiment, 16 ($=2^4$) color-correction function circuits are prepared since two kinds of thin and thick inks are used for each color.

Since each color-correction function consists of the color-correction function of each color, the color-correction functions actually consist of four expressions. Namely, assuming that the output digital signals are Y', M', C', BL', the i-th color-correction functions are represented by $$\begin{cases} Y' = f_{Yi} \ (Y, M, C, BL) \\ M' = f_{Mi} \ (Y, M, C, BL) \\ C' = f_{Ci} \ (Y, M, C, BL) \\ BL' = f_{BLi}(Y, M, C, BL) \end{cases}$$

These expressions are constituted in such a manner that when a combination of the corresponding thin and thick inks is used, an color reproduction error becomes least.

For example, the first color-correction function (1) is the color-correction function having the least color reproduction error in case of (Y, M, C, BL)=(thin, thin, thin, thin).

Such a color-correction function can be easily obtained by, for example, measuring the results of which Y, M, C, and BL were printed using inks having various densities and by applying a method of least squares to the relations between the measurement values and the linear combinations of Y, M, C, and BL.

If necessary, it may be possible to apply the method of least squares as the linear combinations of not only the primary terms of Y, M, C, and BL but also their secondary terms or other special function systems. In this way, the data which was color-corrected through the color-correction functions selected in dependence upon the input data Y, M, C, and BL is transferred to the drivers.

Figure 7:
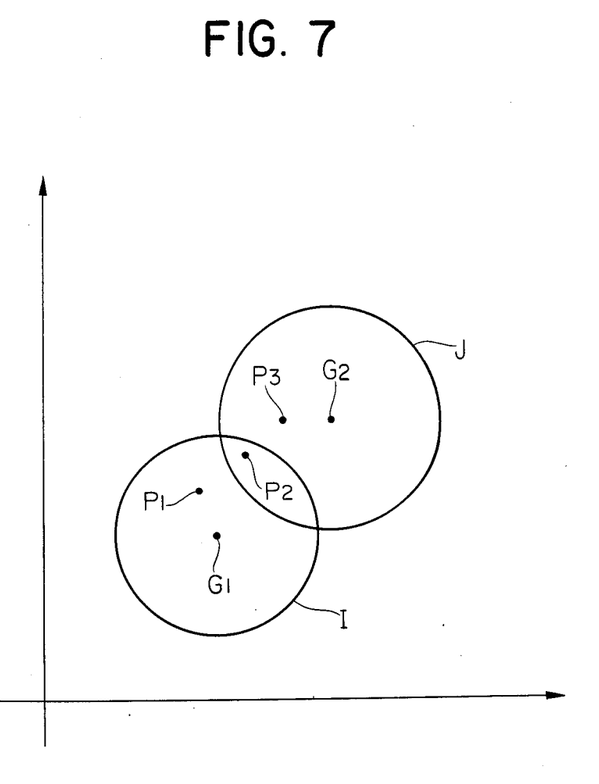
FIG. 7 is a diagram showing areas in a color space where the color reproduction is possible.

A color range which can be reproduced by changing dot diameters of inks using the inks of Y, M, C, and BL can be correctly written in a chromaticity diagram; however, for simplicity of explanation, it is assumed here that it can be shown as a range on a two-dimensional graph as shown in FIG. 7 (For instance, a color space can be represented by two dimensions using a CIE chromaticity diagram.) It is now assumed that the area I denotes the color reproduction range when the thin inks, i.e., the color-correction function (1) was selected for every Y, M, C, and BL and that the area J represents the color reproduction range when the thick ink was used for only Y and when the thin inks, i.e., the color-correction function (2) was selected for M, C and BL. If a color which one desires to reproduce is P1 in the area I, only the color-correction function (1) will be selected. Similarly, when a color is P3 in the area J, the color-correction function (2) is unconditionally selected. However, in case of such a point P2 that is included in both areas I and J, a method is considered whereby the distance from the center of gravity G1 of the area I or from the center of gravity G2 of the area J is obtained, thereby selecting the color-correction function relating to the nearest distance; however, there is a case where a pseudo boundary appears at the intersection of the areas I and J.

Due to this, a switch in the switch circuit 52' is controlled in such a manner as to select the color-correction functions (1) and (2) alternately or at random with respect to a color range of this product set portion, thereby reducing the pseudo boundary.

For simplicity of description, the color ranges regarding to two color-correction functions are shown in FIG. 7, but there is actually a case where a product set of the color ranges which can reproduce three or more color-correction functions exists. Therefore, it is possible to use three or more color-correction functions by switching them sequentially or at random. In addition, as the method of selecting color-correction functions, various methods can be considered: for example, an alternating method of sequentially selecting the color-correction functions in a reproduction range; a random method of selecting at random; and a probability method of selecting on the basis of the probability depending upon the distances from the respective centers of gravity, and the like. On one hand, even if a color is out of a color reproduction range, areas close to the color reproduction range may be also included in the range which is selected and used.

In FIG. 6, the arithmetic operation circuit 51' serves to operate which color-correction function should be used for the input picture data. For example, variable ranges of densities for monochrome of the ink which constitutes the area i will be represented by $$\begin{cases} Y_{Li} < Y' < Y_{Hi} \\ M_{Li} < M' < M_{Hi} \\ C_{Li} < C' < C_{Hi} \\ BL_{Li} < BL' < BL_{Hi} \end{cases} \quad (1)$$

Now, assuming that the color-correction functions corresponding to the area i are $$\begin{cases} Y' = f_{Yi} \ (Y, M, C, BL) \\ M' = f_{Mi} \ (Y, M, C, BL) \\ C' = f_{Ci} \ (Y, M, C, BL) \\ BL' = f_{BLi}(Y, M, C, BL) \end{cases} \quad (2)$$

the following conditions will be needed to be satisfied.

$$\begin{cases} Y_{Li} < f_{Yi}\ (Y, M, C, BL) < Y_{Hi} \\ M_{Li} < f_{Mi}\ (Y, M, C, BL) < M_{Hi} \\ C_{Li} < f_{Ci}\ (Y, M, C, BL) < C_{Hi} \\ BL_{Li} < f_{BLi}(Y, M, C, BL) < BL_{Li} \end{cases} \quad (3)$$

The conditions of inequalities (3) represent a color space; in this embodiment, 16 color spaces exist. The arithmetic operation circuit 51' operates in which color space the input data is included and outputs a 16-bit signal to the selection change-over circuit 50'. Although the selection change-over circuit 50', can be easily realized as a software using a microcomputer, it can be realized by way of an ROM table reference method as a hardware shown in FIG. 8.

Figure 8:
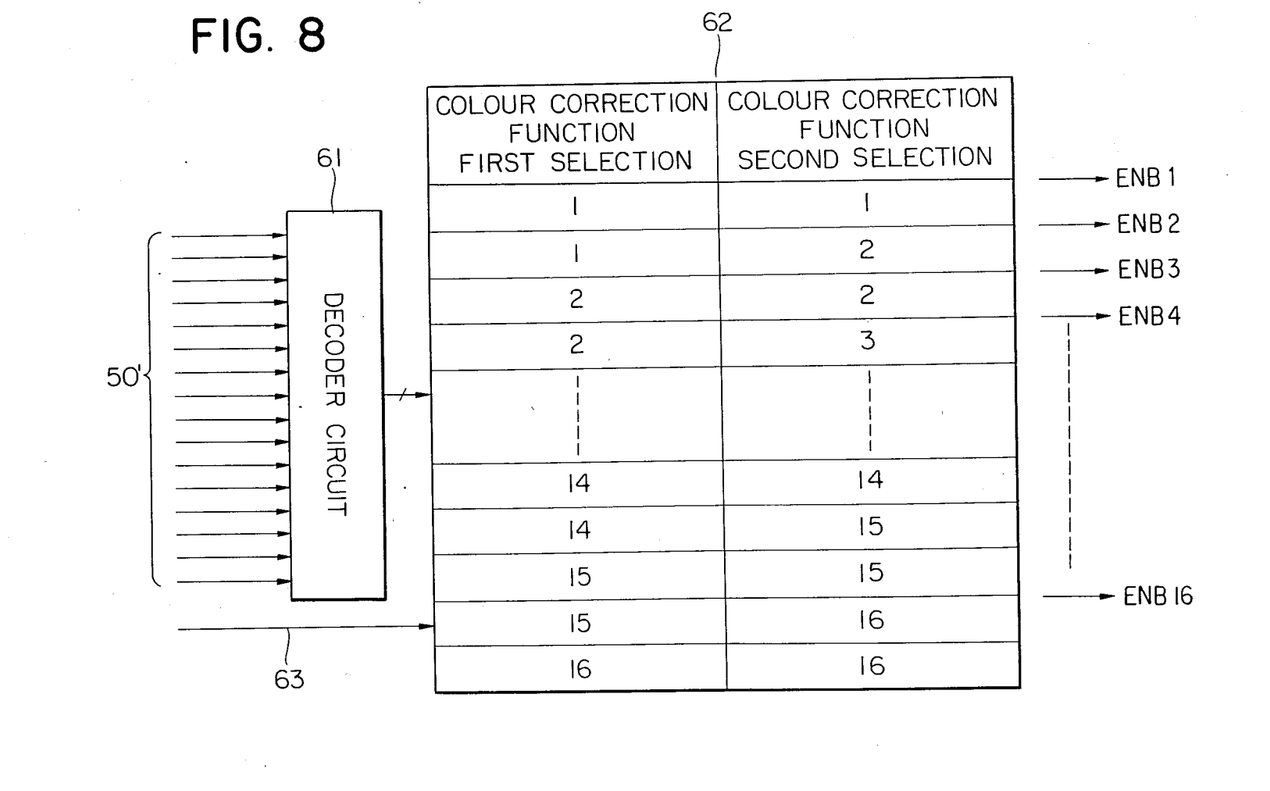
FIG. 8 shows a block diagram of a switching control circuit 51.

In the case where the color spaces overlap, it is assumed that two color-correction functions are alternately selected. The data from the arithmetic operation circuit 50' is inputted to a decoder circuit 61 and addresses in an ROM table 62 are selected. Furthermore, a two-value signal which changes depending upon the movement of the recording head in the main scanning direction is inputted through a signal line 63 to the ROM table 62. When the two-value signal is "0", the color-correction function of the first selection is enabled, while when it is "1", the color-correction function of the second selection is enabled, thereby outputting ENB signals 1–16.

Figure 9:
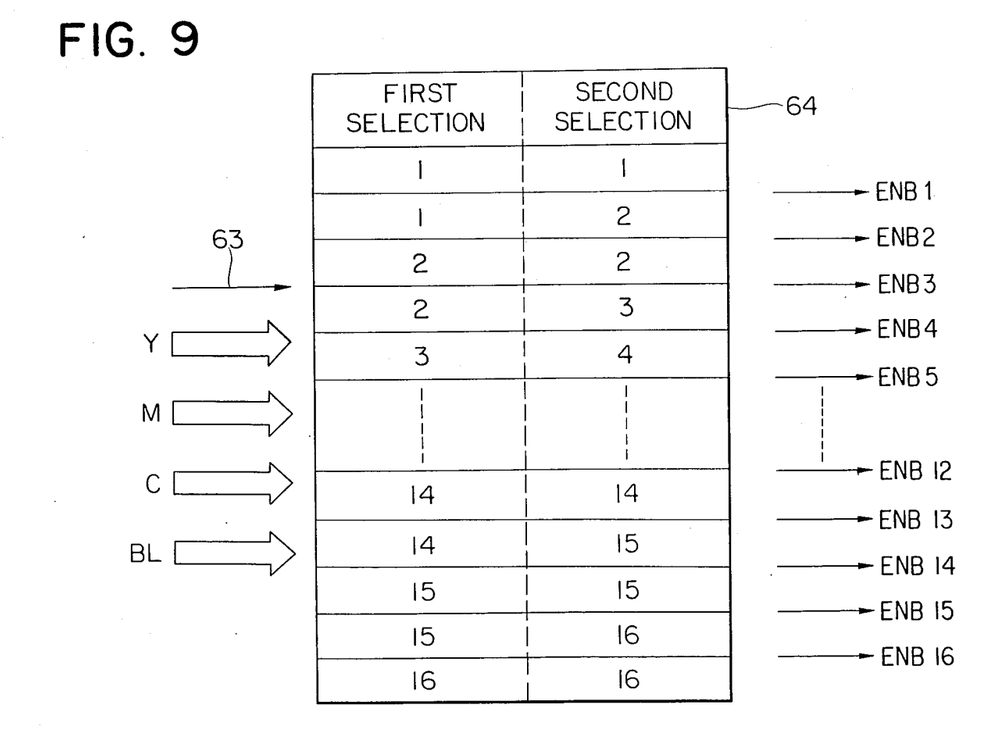
FIG. 9 shows a selection circuit diagram of other color-correction functions.

Although the means for selecting the color-correction functions is constituted by the arithmetic operation circuit and the selection change-over control circuit in the above embodiment, it can be also constituted by one ROM table. In other words, as shown in FIG. 9, the data of Y, M, C, and BL and the position signals of the heads are directly inputted to an ROM table 64, thereby switching the color-correction functions to be selected in response to changes of the position signals. In the case where each color consists of 8-bit data, $2^{32+1}$ addresses exist, but the memory capacity can be reduced by omitting the least significant bit of the data of each color.

When such Y, M, C, and BL as to access data 1 with respect to both first and second selections in the ROM table 64 were inputted, only the color-correction function (1) is selected irrespective of the addresses. On the other hand, when such Y, M, C, and BL as to access data 1 for the first selection and to access data 2 for the second selection were inputted, the color-correction functions (1) and (2) are alternately selected in dependence upon the input level of the input signal line 63 whether it is "0" or "1". In this way, the switch in the switch circuit 52' is turned on in response to the outputs of the ROM tables 62 and 64, so that the optimum color-correction function is selected. In addition, when there are two color-correction functions which can reproduce, these two color-correction functions are alternately selected.

Similarly, in case of the random method, "0" or "1" may be inputted to the signal line 63 at random, while in case of the probability method, the probability data to select the first and second selections is inputted in the ROM table 64 and it may be inputted to the address line. Any methods as mentioned above can be realized by the ROM table reference method.

As described above, in the second embodiment, the optimum color reproduction is always performed by making the color-correction methods different depending upon the combination of the colorants to be used and at the same time, in the area where the combination changes, the combination of the colorants is switched and controlled; therefore, it is possible to reproduce a natural picture whereby the pseudo boundary hardly occurs.

In addition, although an example of the ink-jet printer has been described in the above embodiments, the present invention is not limited to this but it can be applied to every color printer using colorants having different densities with regard to each color.

As described above, different color-correction processings are performed for every area which was divided in the color space or in accordance with the combination of colorants to be used; therefore, it is possible to obtain a color picture with good picture quality.

Although the present invention has been shown and described with respect to preferred embodiments, various changes and modifications which are obvious to a person skilled in the art to which the invention pertains are deemed to lie within the spirit and scope of the invention.

What is claimed is:

1. Color picture forming method comprising the steps of:
    inputting color input picture data;
    forming a color picture using a plurality of colorants by selecting one of a plurality of combinations of colorants in response to the color input picture data;
    providing a plurality of color correction processings corresponding to the plurality of combinations of colorants; and
    selecting the color correction processing corresponding to the selected combination of colorants.

2. Color picture forming method according to claim 1, wherein said colorants comprise at least cyan, magneta, yellow, and black colorants.

3. Color picture forming method according to claim 2, wherein at least one of said colorants further comprises a plurality of colorants of different densities.

4. Color picture forming method according to claim 1, wherein in said forming step, the color picture is formed by an ink jet head.

5. Color picture data processing method comprising the steps of:
    inputting color input picture data;
    dividing a color space into a plurality of areas;
    providing a corresponding color correction processing for each of said areas; and
    selecting at least two of said color correction processings for the color input picture data in a mutually exclusive random of alternating manner.

6. Color picture forming method of reproducing a color picture in accordance with color input picture data using a plurality of colorants, comprising the steps of:
    dividing a color space into a plurality of areas in dependence upon different combinations of colorants to be used;
    providing a corresponding color correction processing for each of said plurality of areas; and
    selecting at least two of said color correction processings for the color input picture data in a mutually exclusive random or alternating manner.

7. Color picture forming method according to claim 6, wherein said colorants comprise at least cyan, magenta, yellow, and black colorants.

8. Color picture forming method according to claim 7, wherein at least one of said colorants further comprises a plurality of colorants of different densities.

9. Color picture forming method comprising the steps of:
   inputting color input picture data;
   forming a color picture usuing a plurality of colorants;
   providing a plurality of color correction processings corresponding to a plurality of combinations of colorants; and
   selecting at least two of said color correction processings for the color input picture data in a mutually exclusive random or alternating manner.

10. Color picture forming method according to claim 9, wherein said colorants comprise at least cyan, magenta, yellow, and black colorants.

11. Color picture forming method according to claim 10, wherein at least one of said colorants further comprises a plurality of colorants of different densities.

12. Color picture forming method according to claim 9, wherein in said forming step, the color picture is formed by an ink jet head.

13. A color picture forming apparatus comprising:
   color picture forming means for forming a color picture using a plurality of colorants;
   a pluraltiy of processing means for performing color-correction processing of color input picture data;
   selecting means for selecting at least two of said plurality of processing means in accordance with the color input picture data; and
   switching means for switching between said selected processing means in a mutually exclusive random or alternating manner.

14. A color picture forming apparatus according to claim 13, wherein said colorants comprise at least cyan, magenta, yellow, and black colorants.

15. A color picture forming apparatus according to claim 14, wherein at least one of said colorants further comprises a plurality of colorants of different densities.

16. A color picture forming apparatus according to claim 13, wherein said color picture forming means includes an ink jet head.

17. Color picture forming method of reproducing a color picture, comprising the steps of:
   inputting color input picture data;
   providing colorants for a pluraltiy of different colors, wherein a plurality of colorants of different concentrations are provided for at least one of the different colors;
   providing a plurality of different color correction processings corresponding to a pluraltiy of different combinations of said colorants; and
   selecting one of said pluraltiy of different combinations of said colorants and a corresponding one of said plurality of different color correction processings in response to the color input picture data.

* * * * *